United States Patent
Brendel

(10) Patent No.: US 6,587,438 B1
(45) Date of Patent: Jul. 1, 2003

(54) WORLD-WIDE-WEB SERVER THAT FINDS OPTIMAL PATH BY SENDING MULTIPLE SYN+ACK PACKETS TO A SINGLE CLIENT

(75) Inventor: Juergen Brendel, Santa Clara, CA (US)

(73) Assignee: Resonate Inc., Mountain View, CA (US)

( * ) Notice: Subject to any disclaimer, the term of this patent is extended or adjusted under 35 U.S.C. 154(b) by 0 days.

(21) Appl. No.: 09/470,143

(22) Filed: Dec. 22, 1999

(51) Int. Cl.$^7$ .................... G08C 15/00; H04J 1/16; H04J 3/14; H04L 12/26
(52) U.S. Cl. ........................ 370/238; 370/254
(58) Field of Search .................. 370/238, 229, 370/235, 232, 233, 234, 255, 256, 254, 389, 395.31, 395.32, 410, 395.2, 392, 238.1, 393.21

(56) References Cited

U.S. PATENT DOCUMENTS

| | | | | |
|---|---|---|---|---|
| 5,007,052 A | * | 4/1991 | Flammer ................. | 370/389 |
| 5,193,151 A | | 3/1993 | Jain ..................... | 395/200 |
| 5,444,706 A | | 8/1995 | Osaki ................... | 370/94.1 |
| 5,570,346 A | | 10/1996 | Shur .................... | 370/17 |
| 5,633,861 A | * | 5/1997 | Hanson et al. ........... | 370/232 |
| 5,727,002 A | | 3/1998 | Miller et al. ........... | 371/32 |
| 5,774,660 A | * | 6/1998 | Brendel et al. .......... | 709/201 |
| 5,802,106 A | | 9/1998 | Packer .................. | 375/225 |
| 5,898,668 A | | 4/1999 | Shaffer ................. | 370/230 |
| 5,928,330 A | | 7/1999 | Goetz et al. ............ | 709/231 |
| 6,061,349 A | * | 5/2000 | Coile et al. ............ | 370/389 |
| 6,104,717 A | * | 8/2000 | Coile et al. ............ | 370/401 |

* cited by examiner

Primary Examiner—Wellington Chin
Assistant Examiner—Jamal A. Fox
(74) Attorney, Agent, or Firm—Stuart T. Auvinen

(57) ABSTRACT

An optimal path through the Internet to a client is determined by the server during connection establishment. During the 3-way handshake that establishes a connection, a web server ordinarily sends a single SYN+ACK packet to the client. Instead of sending just one SYN+ACK packet, the server is modified to send multiple SYN+ACK packets, each using a different path to the client. When the multiple SYN+ACK packets are sent from the server at the same time, the first packet that reaches the client used the fastest path through the Internet. The client responds to this first SYN+ACK packet with an ACK packet back to the server. The other SYN+ACK packets that use slower paths arrive at the client after the first SYN+ACK packet and are ignored by the client as being out-of-order. The server includes a different sequence number with each SYN+ACK packet. The client increments this sequence number and includes the incremented sequence number in the ACK packet. The server reads this incremented sequence number in the ACK packet to determine which packet reached the client first. The path used by this packet is then included in source-routing fields of all future packets in the connection.

20 Claims, 6 Drawing Sheets

MULTICAST PING

WORLD-WIDE-WEB SERVER THAT FINDS OPTIMAL PATH BY SENDING MULTIPLE SYN+ACK PACKETS TO A SINGLE CLIENT

FIELD OF THE INVENTION

This invention relates to network routing, and more particularly to measurement and selection of network paths.

BACKGROUND OF THE INVENTION

The Internet was designed from the beginning to be a de-centralized network providing many alternate connection paths. Failed nodes on the Internet can be routed around, ensuring that the network continues to operate even under the severest of situations.

Today's commercial web sites often take advantage of this de-centralized topography. A web site may connect to the Internet through several different ports or gateways. Should one gateway fail, the web site remains accessible through the other gateways. Thus e-commerce may continue to operate despite equipment or network failures.

Communication between a client and a server is partitioned into packets that are sent over the Internet. These Internet Protocol (IP) packets are often sent and returned over the same path, although some web sites route outgoing packets through a different gateway. The IP packets contain a destination IP address. Intermediate routers along the path read the destination IP address and route the packet toward its destination. Intermediate routers typically choose the path with the fewest number of hops to the destination. Some routers may send packets over alternate routes when congestion is detected on the shortest route. However, this congestion-detection and re-routing is relatively localized to a small portion of the overall route.

Internet traffic patterns may change suddenly and without warning. A major news story develops, causing the routers and lines, which handle packets to news sites, to suddenly become overloaded, slowing down unrelated network traffic that passes through the same 'area' of the Internet. A network provider may experience sudden technical difficulties and its network slows down. All clients connected to a web site through this provider's network now suddenly experience a lower quality of service.

In today's point-and-click economy, a consumer may not wait when web pages are slow to download. The consumer may simply move on to a competitor's web site that is not experiencing slowness. Sales can be lost due to these temporary slowdowns caused by network congestion or failures. Sales are still lost even when the slowdowns or failures are not caused by the web site itself but are instead caused by intermediate network points.

The web site may exercise some control over the network path chosen. There are several ways to accomplish this. One control method is called IP source routing. When using IP source routing, a list of intermediate IP addresses can be included in the IP header of packets sent to the client. Intermediate routers then route the packet to the next IP address in the list. Such source-based routing allows a web site to choose the connection path to the client. Other methods to control the network path may be used, such as including the MAC address of a gateway in the packet header, or using tags that specify a network point. However, to choose the fastest path requires that the web site somehow measure delays within the Internet.

One method of measuring delays in a network path is by using a ping. A ping command causes a host to send one or more packets to a destination site. The destination site responds with an acknowledgement. The round-trip time of the packet and its acknowledgement packet can be measured. A related command, known as a trace route also sends multiple packets toward a destination. For a trace route, these packets have varying timeouts set that cause the packets to be returned to the host after different numbers of hops before reaching the destination. For example, one packet returns after 1 hop, another after 2 hops, a third after 3 hops, and others after 4, 5, and 6 hops. Another packet reaches the destination and returns. From the differences in round-trip delays, the host can calculate the delays between each of the intermediate routers and the number of hops to the destination.

FIG. 1 illustrates using a multi-cast ping to measure network delays. Server 12 connects to the Internet through gateway 14. Server 12 sends ping packets toward clients 10, 11, 13. The ping packets sent to client 10 reach intermediate router 22 after one hop, and after 2 hops reach router 24, and after 3 hops arrive at the client's Internet Service Provider (ISP) 18. Client 10 responds to the ping packet with an acknowledgement packet sent to server 12 through ISP 18 and intermediate routers 22, 24. The overall delay is measured by the server from the round-trip delay of the ping packet.

Likewise, ping packets are also sent to client 11, through router 21 and ISP 17. Ping packets sent to client 13 are received by ISP 19 through routers 26, 25, but ISP 19 returns packets over a different route using routers 28, 23.

By periodically multicasting pings to clients 10, 11, 13, server 12 can detect slow parts of the Internet. See U.S. Pat. No. 5,727,002 by Miller et al., and assigned to Starburst Communications Corp.

Such ping multicasting to multiple clients is useful when the clients pinged are the ones being connected to. When other clients that are not pinged connect, information about routes to those clients may be incomplete. Multicasting to multiple clients, including clients that are not currently connected, is wasteful and creates network congestion itself. Furthermore, generating multiple ping packets to many different clients may raise security concerns with various ISPs, since they may be misunderstood as a possible beginning of a hacker attack. Also, it may not be known which clients will later connect to a web site.

FIG. 2 shows network monitoring. Another approach is to directly monitor one or more of the intermediate routers or network nodes. See U.S. Pat. No. 5,898,668 by Shaffer. Monitor 20 continuously monitors network traffic loads at routers 21, 22, 24. Server 12 can receive status reports from monitor 20 and route packets to the least-loaded of routers 21, 22, 24. For example, router 21 may be lightly loaded, and server 12 connects to client 10 and its ISP 18 using router 21 rather than routers 22, 24.

However, such network monitoring is rather limited. Monitor 20 does not monitor other network nodes, such as routers 23, 25, 26, 28. These routers may be on a more direct path to client 10, or may be along the only path to client 10. Since monitor 20 does not monitor these nodes, the best path among routers 23, 25, 26, 28 cannot be determined.

Such network monitoring requires specialized hardware or software that is not available on most Internet routers. Often only the nodes near a gateway are monitored. Thus such monitoring is limited at best.

While such methods of measuring speeds of Internet connections are useful, neither is ideal for standard client connections to a web-site. Multicasting to multiple clients is undesirable since network traffic is increased. Since knowledge of which of millions of clients will later connect to a public web site is often unobtainable, prior multicasting has limited utility for a web site. Measurements may not be useful when connecting to a client that was not multicasted to. Monitoring is limited to relatively few sites on the Internet and does not measure delays along the entire path to an arbitrary client. It is undesirable to add special multicasting or monitoring software to various sites. Continuous monitoring or multicasting is undesirable as it increases system overhead and network traffic. Monitoring devices may not measure actual packet delays, but rather measure node-specific parameters such as link or buffer loading.

What is desired is a network measurement that measures actual network delays to a client. It is desired to measure delays only when a new connection with a client is established. It is desired to avoid continuous monitoring. It is further desired to use standard network software without modifying intermediate network nodes. It is also desired to modify only the server software while not modifying the client. A network speed measurement is desired that measures delays to any arbitrary client with standard TCP/IP software. It is further desired to measure delays for multiple paths to a single client and to choose the fastest path for a new connection between a server and the client. Client-specific measurement for routing selection is desired.

SUMMARY OF THE INVENTION

A method is for establishing a new connection with a client over an optimal network path by a server that considers path delays. An initial packet is received from the client. The initial packet requests the new connection with the server. Multiple initial reply packets are generated. Each initial reply packet of the multiple initial reply packets traverses at least a portion of different network paths from the server to the client.

A plurality of packet identifiers are generated. A different packet identifier is written to each of the multiple initial reply packets. The multiple initial reply packets with different packet identifiers are transmitted from the server. The multiple initial reply packets reach the client over different network paths.

An acknowledgement packet is received from the client. The acknowledgement packet includes a packet identifier that uniquely identifies a first packet. The first packet is one of the multiple initial reply packets.

The network path used by the first packet is selected as the optimal network path. At least a portion of the optimal network path from the server to the client is specified for the any future packets sent to the client. Thus the optimal network path is selected from among the different network paths of the multiple initial reply packets sent to the client in response to the acknowledgement packet from the client.

In further aspects the client ignores other packets of the multiple initial reply packets that arrive at the client after the first packet arrives at the client, or the client generates additional packets to the server for each of the multiple initial reply packets that arrive at the client after the first packet arrives at the client.

In still further aspects, the plurality of packet identifiers are server sequence numbers that are incremented for each data or SYN packet sent or received by the server.

In still further aspects, the initial packet is a TCP packet with a SYN flag that is set, but an ACK flag that is not set. Each initial reply packet of the multiple is a TCP packet with a SYN flag that is set, and an ACK flag that is also set. The acknowledgement packet is an IP packet with a SYN flag that is not set, and an ACK flag that is also set. Thus path measurement and selection is integral with a 3-way handshake to establish the new connection between the server and client.

DETAILED DESCRIPTION

Figure 1:
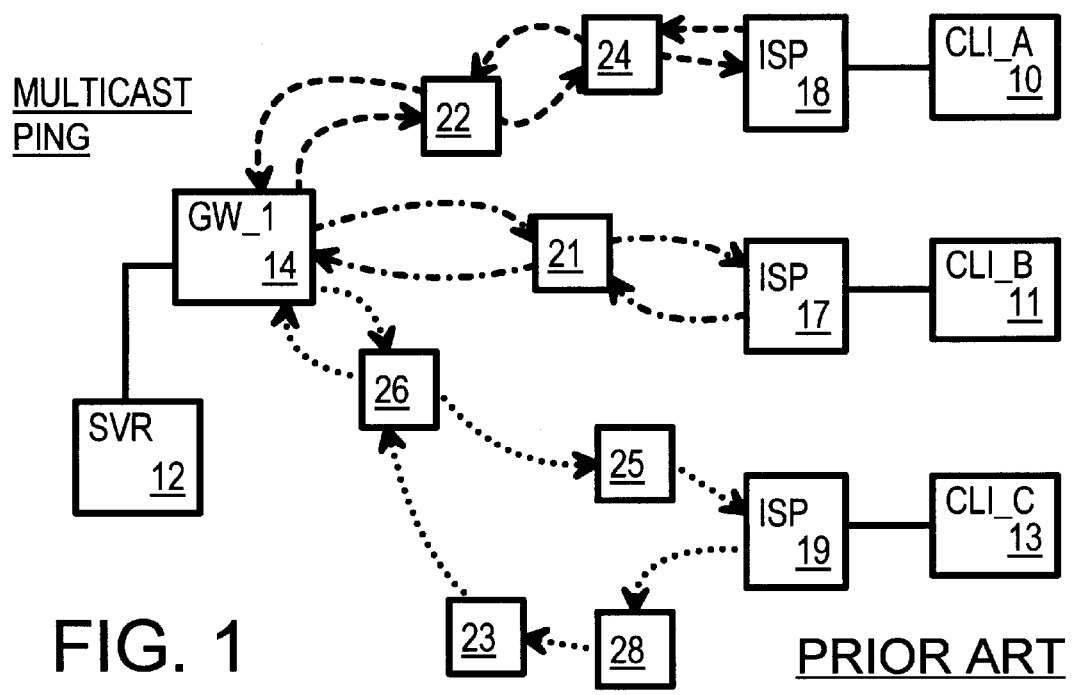
FIG. 1 illustrates using a multi-cast ping to measure network delays.
Figure 2:
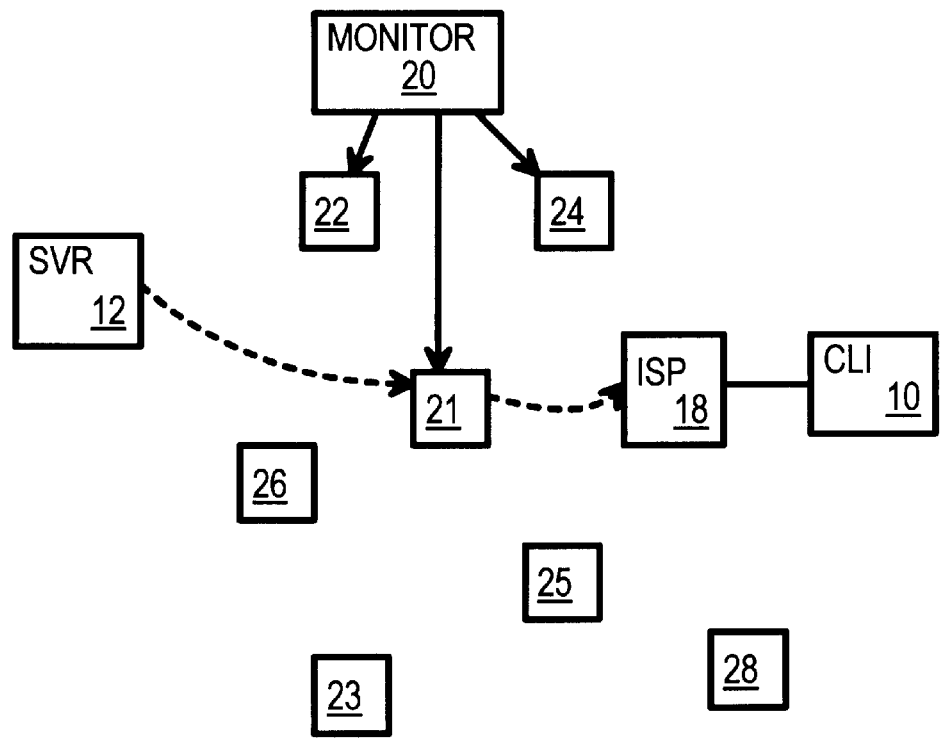
FIG. 2 shows network monitoring.

The present invention relates to an improvement in network path measurement and routing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that most web traffic consists of relatively short connections. Rather than continuously monitor network speeds, the inventor realizes that an initial measurement can be made of paths from the server to the client as a new connection is made. A separate measurement can be made for each of several possible paths to the client. The server can then choose the fastest path and use this path for the new connection with the client. The one-way path from server to client rather than the full round-trip delay is measured.

The inventor has further realized that the server's transmission control protocol (TCP) software may be slightly modified in an unusual way to send out multiple packets to the same client rather than just one packet. Each of the multiple packets can be sent over a different path to the client. Since these packets are sent at the same time, the packet sent over the fastest path is the first packet received by the client. This first packet is acknowledged by the client. Other packets that were sent over slower paths are dropped by the client.

When the server receives the acknowledgement packet from the client, it identifies which path the packet was sent over and uses this path for all future packets sent to the client during the connection. The server can identify the path using the sequence numbers in the packet's header.

Many different network protocols can be used with the invention. A preferred embodiment uses TCP/IP, which is described here in a detailed embodiment. Since the standard behavior of client TCP software is to acknowledge the first packet received, and to drop or acknowledge the other packets by sending a corrected sequence number, no modification is required of the client software. Only the server software is modified to send multiple packets rather than one packet during connection establishment.

The delays measured are for the actual paths to the client. The delay of the entire path is measured rather than just a portion of the Internet. These measurements are taken as the connection is established and thus reflect current network conditions and loads. New measurements are made with each new connection. Rather than explicitly measure time delays, these measurements are indirectly made by determining which packet arrives first.

Sessions that require multiple connections are thus adjusted for changing network conditions. Also if the client is migrated to a different server, such as when a new connection is made to a secure server for completing a payment transaction, the measurement may be repeated by the new server when the new connection is made.

Figure 3A:
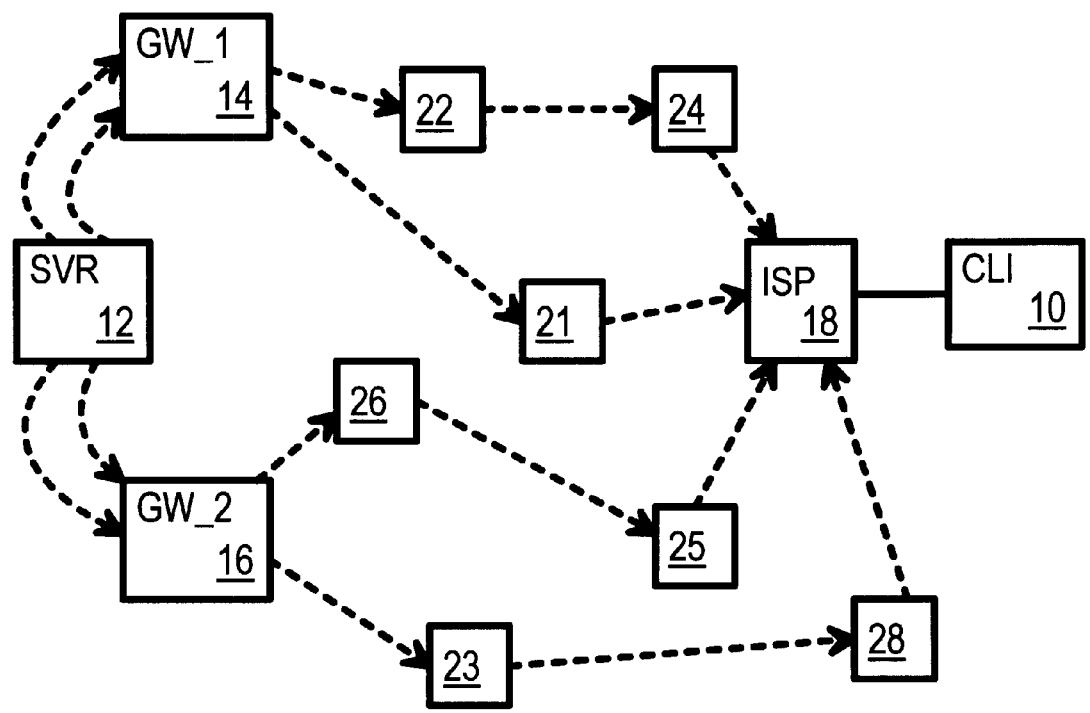
FIG. 3A shows multiple acknowledgement packets sent from the server to a single client that is establishing a new connection.

Multiple Packets Sent to One Client—FIG. 3A

FIG. 3A shows multiple acknowledgement packets sent from the server to a single client that is establishing a new connection. Server 12 is connected to the Internet through two gateways: gateway 14 and gateway 16. Client 10 is connected to the Internet backbone through ISP 18. A variety of paths through the Internet routers 21–28 are possible. One of these paths can be specified in the packet's header using source routing, a list of the IP addresses of the intermediate routers in the desired path. Other methods may be used to specify the routing, such as using a tag or a MAC address of a gateway.

TCP packets include a header with flags that can be set to specify the kind of packet. A synchronize SYN flag in the header is set for the initial packets while an acknowledgement (ACK) flag is set for reply packets. Clients normally establish a connection with web servers with a 3-way handshake:
1. The client sends a SYN packet to the server.
2. The server responds with a SYN+ACK packet to the client.
3. The client responds with an ACK packet.

Client 10 requests a new connection with server 12 by transmitting a SYN packet to server 12. Server 12 responds by sending multiple SYN+ACK packets rather than just one SYN+ACK packet as is normally required by the TCP protocol. Each of these multiple SYN+ACK packets are sent over a different path from server 12 to client 10.

One SYN+ACK packet is sent from server 12 through gateway 14 and intermediate routers 22, 24 to ISP 18 and client 10. Another SYN+ACK packet is sent through gateway 14 and intermediate router 21 to ISP 18 and client 10. Two more SYN+ACK packets are sent from server 12 through gateway 16. One packet passes through intermediate routers 26, 25 before arriving at ISP 18, while the other is sent through intermediate routers 23, 28 to ISP 18.

Assuming that no routing errors occur, all four SYN+ACK packets eventually arrive at client 10. However, these packets arrive at slightly different times. Client 10 expects only one SYN+ACK packets. The other SYN+ACK packets are considered an error and are processed transparently by error handling software on client 10. The already-established connection is not disrupted, and the client does not notice anything unusual. The first SYN+ACK packet that arrives at client 10 is responded to in the normal fashion, while the slower packets are ignored as out-of-order, or a reply is sent back to server 12 with the correct sequence number that the client expects from the server in the ACK field.

Figure 3B:
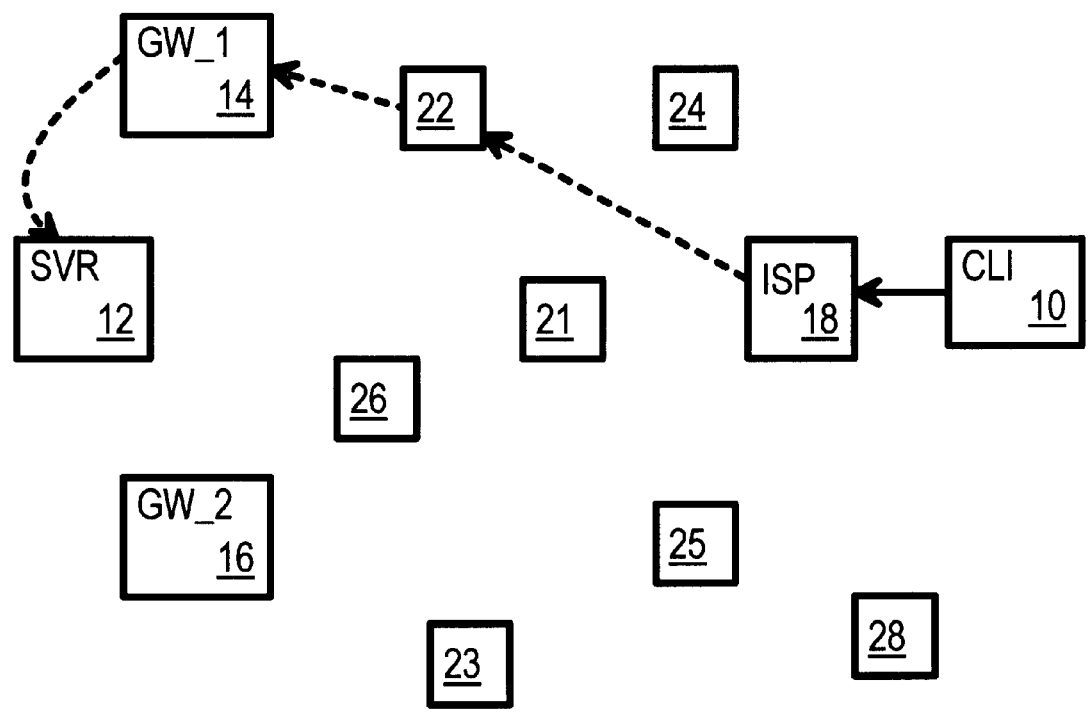
FIG. 3B shows the client responding to the SYN+ACK packet that arrived first over the fastest path.

Client Responds to First-Received Packet, Ignores Slower Packets—FIG. 3B

FIG. 3B shows the client responding to the SYN+ACK packet that arrived first over the fastest path. In this example, all four packets from server 12 were transmitted at about the same time, but routing delays within the Internet backbone, gateways, or local networks caused the packets to arrive at client 10 at different times.

The packet sent through intermediate router 22 arrives first at client 10. Client 10 responds to this SYN+ACK packet by generating an ACK packet in the normal fashion. This ACK packet is transmitted by client 10 through its ISP 18 back to server 12. The same path or a different path may be used by the client to return the ACK packet to the server.

Server 12 receives the ACK packet and reads the sequence number in the packet header. Each of the SYN+ACK packets sent by server 12 (FIG. 3A) uses a different sequence number. Client 10 modifies this sequence number in a predetermined way and includes it in the ACK packet header. Thus server 12 can determine which packet client 10 responded to simply by examining the sequence number. The route used by that packet is selected for future packets in that connection.

When client 10 receives the other (slower) SYN+ACK packets from server 12, it can respond in two different ways. Client 10 can simply ignore the packets as being out-of-order. Client 10 may respond to the slower packets with packets sent back to server 12 that have the sequence number the client expected in the ACK field of the header. Server 12 can simply ignore these later packets. In either case, client 10 continues the connection. This is the standard TCP behavior.

Figure 4:
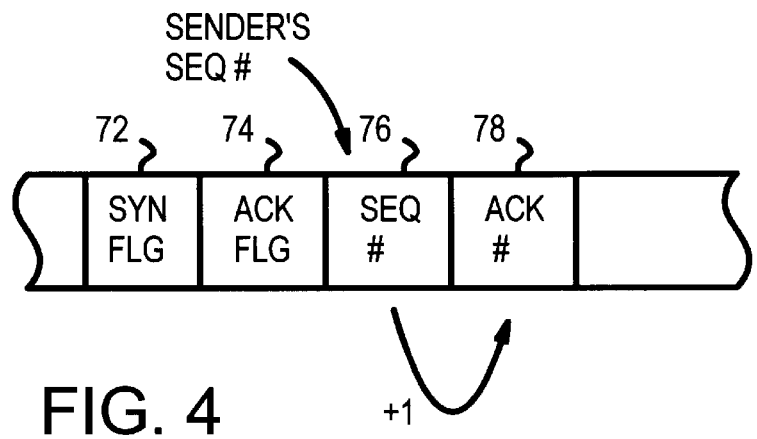
FIG. 4 shows a portion of a packet's header that includes sequence numbers.

Sequence Numbers in Header—FIG. 4

FIG. 4 shows a portion of a packet's header that includes sequence numbers. The order of packets is indicated by sequence numbers. The client and the server each have their own sequence numbers, so packet headers contain two sequence numbers. The sender's sequence number is stored in sequence number field 76, which is known as the sequence (SEQ) number field. The receiver's sequence number is sent back as an acknowledgement in acknowledgement number field 78, which is known as the acknowledgement (ACK) number field. The received sequence number is incremented for each new packet transmitted when the SYN flag is set, or incremented by the number of data bytes if the packet contains any data bytes.

The TCP header includes SYN flag 72 and ACK flag 74. SYN flag 72 is set only for the first packet sent by the client (the SYN packet) and the first packet sent by the server (the SYN+ACK packet). ACK flag 74 is clear for the first packet (the SYN packet) but is set for all other packets, including the first packet sent by the server, the SYN+ACK packet.

The header includes two fields for the sequence/acknowledgement numbers. Sequence number field 76 contains the sender's sequence number, while acknowledgement number field 78 contains the receiver's sequence number, the ACK number. The sender can be either the client or the server, depending on which machine sends (transmits) the packet.

When a packet is received, the sender's sequence number is read from sequence number field 76. If the packet contains data or the SYN or FIN flags are set, this sequence number is incremented to generate the ACK number for the next packet. If these special flags are not set, or the packet did not contain any data, the sequence number of that received packet simply becomes the new ACK number of the next packet sent. This ACK number is then written to acknowledgement number field 78 of the next packet. The new sequence number for the sending machine is generated and loaded into sender's sequence number field 76 of this next packet.

Figure 5:
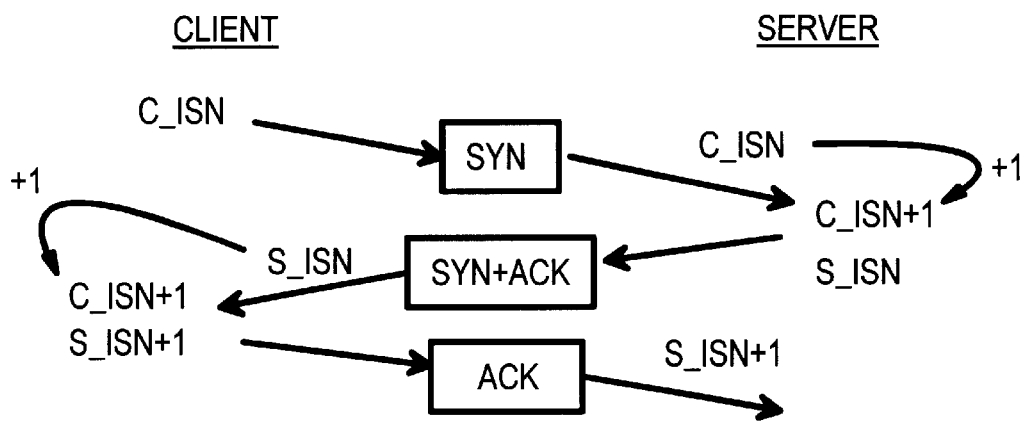
FIG. 5 highlights sequence numbers in a standard 3-way handshake to establish a TCP connection.

Sequence Numbers Incremented In Normal Handshake—FIG. 5

FIG. 5 highlights sequence numbers in a standard 3-way handshake to establish a TCP connection. The client requests a connection with a server by sending a SYN packet to the server. The client generates an initial sequence number (ISN), perhaps using a random or a predetermined method. This client ISN (C_ISN) is written to the sender's sequence number field of the SYN packet's header.

The server receives the SYN packet. The sender's sequence number field is read for the client's ISN, and this number (the client's ISN) is incremented to generate C_ISN+1, the ACK number. The server also generates its own ISN, S_ISN. The server's ISN is always generated independently of the client ISN so that the two sequence numbers can be different.

The server generates a SYN+ACK packet that is transmitted to the client. The sender's sequence number field in the SYN+ACK packet is loaded with the server's ISN (S_ISN), while the acknowledgement sequence number field is loaded with the incremented client ISN, C_ISN+1, which is the ACK number in the SYN+ACK packet.

The client receives the SYN+ACK packet, and checks the client's sequence number. The client reads the ACK number, which is C_ISN+1, the client's ISN incremented by the server. Since the ACK number is the expected number (one larger than the sequence number of the last packet the client transmitted), the client accepts the packet as being in the correct order.

The client needs to send one more ACK packet, so it writes the server's sequence number incremented by one (S_ISN+1) into the ACK field of the next packet. The client increments its own sequence number (so that it becomes C_ISN+1) and writes it into the SEQ field of the packet, which is then sent to the server. This completes TCP's three-way handshake.

The server receives the ACK packet, and checks the acknowledgement sequence number, which is S_ISN+1. Since this is the correct sequence number, one more than the server's last sequence number, the packet is accepted.

The connection continues with ACK packets (not shown) sent back and forth between the client and server, with the sequence numbers updated by server and client and properly acknowledged in the individual TCP packets. The connection is eventually closed by a finish FIN or reset RST packet (not shown).

Figure 6:
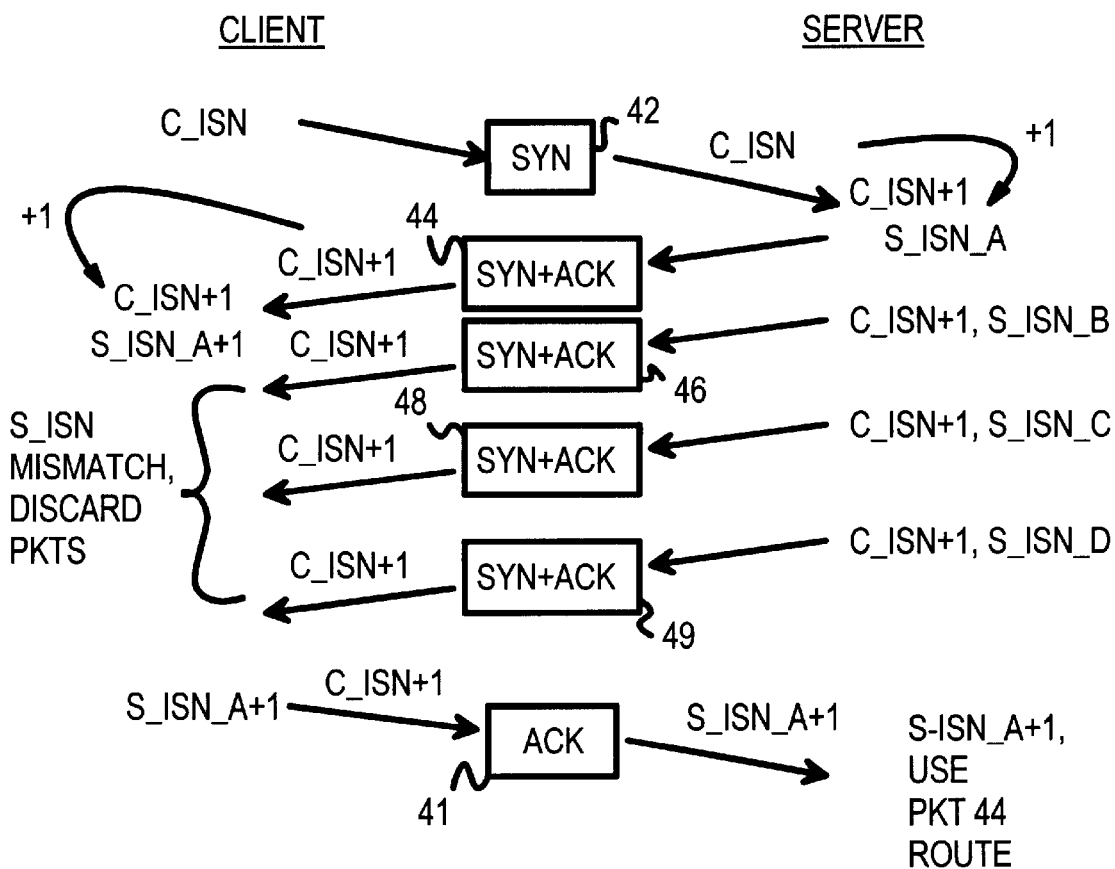
FIG. 6 highlights the server sending multiple SYN+ACK packets to the client to measure delays of different paths through the Internet.

Multiple SYN+ACK Packets to Measure Internet Delays—FIG. 6

FIG. 6 highlights the server sending multiple SYN+ACK packets to the client to measure delays of different paths through the Internet. The 3-way handshake of standard TCP/IP shown in FIG. 5 is modified by the inventor in an unusual way. The server responds with not just one SYN+ACK packet, but with several. Since this is not standard TCP operation, the server's TCP software must be modified to add this unusual functionality.

The client requests a connection to the server by sending SYN packet 42, which includes the client's initial sequence number, C_ISN. The server receives this SYN packet and increments the client's sequence number to C_ISN+1. The server also generates its own initial sequence number, S_ISN.

Rather than generate just one SYN+ACK packet, the server generates multiple SYN+ACK packets 44, 46, 48, 49. All packets have the same client sequence number, C_ISN+1, in the acknowledgement sequence number field in the header. However, different sender's sequence numbers are used for each packet 44–49.

SYN+ACK packet 44 contains S_ISN_A in the sender's sequence number field, while SYN+ACK packet 46 contains S_ISN_B. SYN+ACK packets 48, 49 contain S_ISN_C and S_ISN_D, respectively, as their sender's sequence number. Thus each of multiple SYN+ACK packets 44, 46, 48, 49 contain a different server sequence number. The sequence numbers S_ISN_A, S_ISN_B, etc. can be related or unrelated to each other. For example, each number can be chosen randomly: S_ISN_A is 317, S_ISN_B is 299, S_ISN_C is 710, and S_ISN_D is 403. In another example, each number is 10 larger than the previous: S_ISN_A is 310, S_ISN_B is 320, S_ISN_C is 330, and S_ISN_D is 340. In a third example, each is an increment of the previous: : S_ISN_A is 310, S_ISN_B is 311, S_ISN_C is 312, and S_ISN_D is 313. All SYN+ACK packets 44, 46, 48, 49 are transmitted from the server at about the same time.

Each SYN+ACK packet is sent to the client using a different path through the Internet.

Each packet includes source-routing fields in the IP header that specifies a list of IP addresses of intermediate routers. These packets are sent over the Internet through the specified routers or gateways by routers that read the source-routing fields to make routing decisions.

Because different routes through the Internet are specified by the source-routing fields of packets 44, 46, 48, 49, and the different routes normally have different delays, these packets arrive at the client at different times. In this example, the first packet to arrive at the client is SYN+ACK packet 44. The client checks that the ACK number is correct (C_ISN+1). Since packet 44 has the correct ACK number, it is accepted.

The client then generates ACK packet 41. C_ISN+1 is written to the sender's sequence number field of packet 41, while the increment of the server's sequence number, S_ISN_A+1, is written to the ACK number field of packet 41.

The server uses the server sequence number in ACK packet 41 to determine which of SYN+ACK packets 44, 46, 48, 49 the client responded to. The server subtracts one from the server sequence number in ACK packet 41 to find the sequence number of the SYN+ACK packet the client responded to. This was the SYN+ACK packet that traveled over the fastest path through the Internet to arrive at the client before the other SYN+ACK packets.

In this example, the server subtracts 1 from S_ISN_A+1 of packet 41 to get S_ISN_A. Since SYN+ACK packet 44 had the sequence number S_ISN_A, while the other packets 46, 48, 49 had different server sequence numbers (S_ISN_B, S_ISN_C, and S_ISN_D, respectively), the server determines that SYN+ACK packet 44 was the first received by the client. The route specified for SYN+ACK packet 44 is selected as the fastest route. Future packets sent by the server to the client are routed over the same (fastest) route by including the same source-routing list in the source-routing fields of these future packets. The server uses increments of this sequence number for all future packets with the client.

The other SYN+ACK packets 46, 48, 49 arrive at the client after packet 44. The client compares the established initial sequence number of the server (which it learned from packet 44) to the sequence numbers of these packets, which are S_ISN_B, S_ISN_C, etc. Since the sequence numbers do not match, and no SYN+ACK packet should be received with these other sequence numbers at this stage in the connection, the client considers these packets 46, 48, 49 to be out-of-order. The client either ignores these packets altogether, or replies with correcting acknowledgement packets (not shown) to the server.

Figure 7:
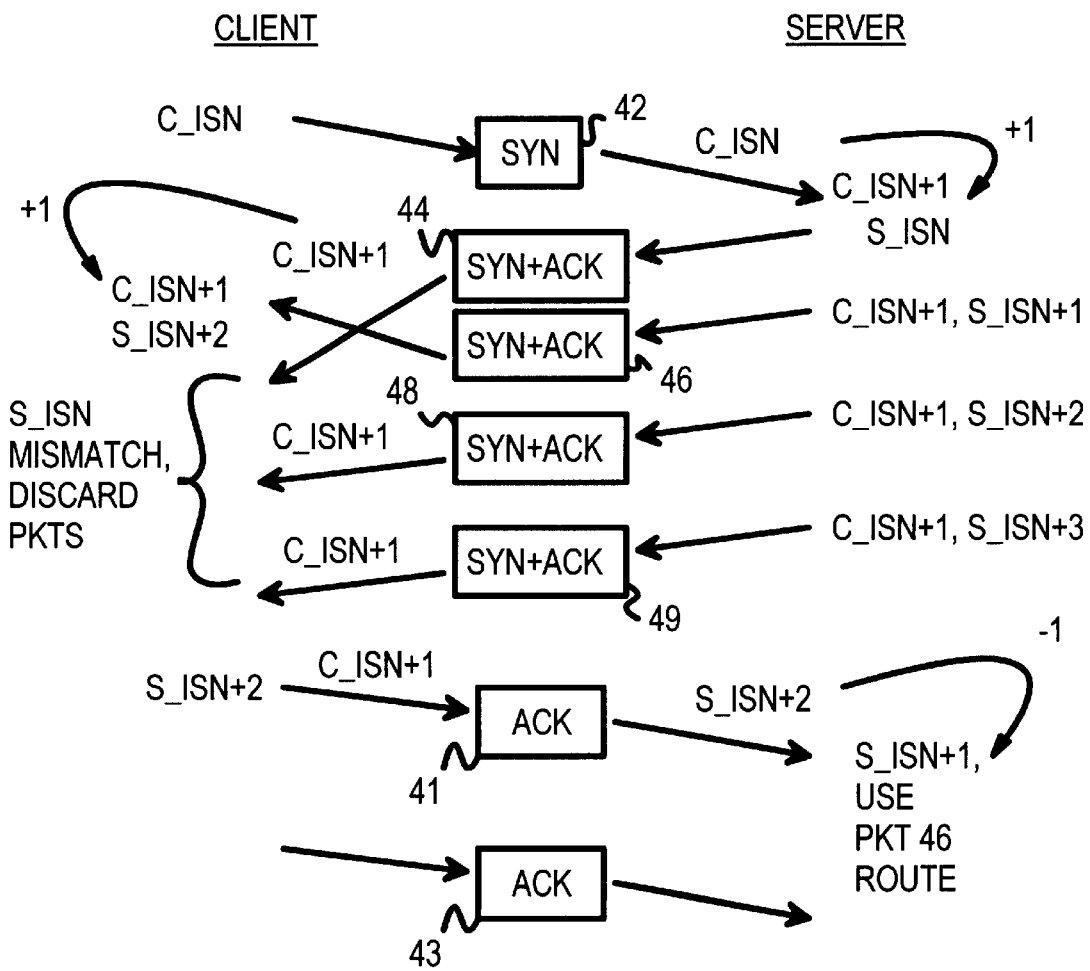
FIG. 7 shows another example where a different SYN+ACK packet is received first by the client.

Client Responds to First SYN+ACK Packet Received—FIG. 7

FIG. 7 shows another example where a different SYN+ACK packet is received first by the client. The example is similar to that in FIG. 6, except that SYN+ACK packet 46 is received first by the client, while SYN+ACK packets 44, 48, 49 are received later and ignored by the client.

The client generates SYN packet 42 with C_ISN, which is incremented by the server to C_ISN+1. The server generates its S_ISN, which is included in SYN+ACK packet 44. Other SYN+ACK packets 46, 48, 49 include the same client sequence number, C_ISN+1, but different server sequence numbers. In the example of FIG. 7, the first S_ISN is simply incremented to generate the server ISN's for the other packets 46, 48, 49. Packet 44 has sequence number S_ISN, packet 46 has S_ISN+1, packet 48 has S_ISN+2, and packet 49 has S_ISN+3.

SYN+ACK packet 46 is the first to arrive at the server, having taken a faster path through the Internet than packets 44, 48, 49. The client checks the client sequence number of packet 46, finds the correct sequence number (C_ISN+1), and increments the sequence number of packet 46. Since SYN+ACK packet 46 has the server sequence number S_ISN+1, the client increments it to S_ISN+2.

The other SYN+ACK packets 44, 48, 49 arrive after packet 46. The client has already received a packet with the correct client sequence number in the ACK field before these other packets are processed. Since these packets 44, 48, 49 carry the client sequence number C_ISN+1, but a different value in the SEQ field, the client detects this wrong sequence number. These packets 44, 48, 49 are out of order.

The client generates ACK packet 41 using C_ISN+1 and S_ISN+2. The acknowledgement sequence number is S_ISN+2 since SYN+ACK packet 46 arrived first, having a sequence number of S_ISN+1.

The server receives ACK packet 41 and stores the client's sequence number C_ISN+1. The server uses the server sequence number in ACK packet 41 to determine which of SYN+ACK packets 44, 46, 48, 49 the client responded to. The server subtracts one from the server sequence number in ACK packet 41 to find the sequence number of the SYN+ACK packet the client responded to. This was the SYN+ACK packet that traveled over the fastest path through the Internet to arrive at the client before the other SYN+ACK packets.

In this example, the server subtracts 1 from S_ISN+2 of packet 41 to get S_ISN+1. Since SYN+ACK packet 46 had the sequence number S_ISN+1, while the other packets 44, 48, 49 had different server sequence numbers (S_ISN, S_ISN+2, and S_ISN+3, respectively), the server determines that SYN+ACK packet 46 was the first received by the client. The route specified in SYN+ACK packet 46 is selected as the fastest route. Future packets sent by the server to the client are routed over the same (fastest) route by including the source-routing list from the header of packet 46 in the source-routing fields of these future packets.

The server does not perform the standard checking of the server sequence number when ACK packet 41 is received. This ACK packet 41 may contain any of a range of server sequence numbers, depending on which of SYN+ACK packets 44, 46, 48, 49 was received first by the client. The server can use a table or subtraction to determine which of the packets the client is responding to. For example, the server can look up the received server sequence number of ACK packet 41 in the first column of the following table:

| ACK # of ACK Pkt | SYN + ACK Packet Seq Num | SYN + ACK Pkt |
|---|---|---|
| S_ISN + 1 | S_ISN | 44 |
| S_ISN + 2 | S_ISN + 1 | 46 |
| S_ISN + 3 | S_ISN + 2 | 48 |
| S_ISN + 4 | S_ISN + 3 | 49 |

The route used by the packet of the last column in the table is selected as the fastest route, and used for subsequent packets in the connection. The routing information can be stored in a table and used for each new packet in that connection. When the connection ends, the table entry can be deleted.

Some client TCP stacks may respond to one or more of the extra SYN+ACK packets from the server. The client may respond by sending a correcting ACK packet that contains the expected sequence numbers. For example, the client responds to SYN+ACK packet 44, the second SYN+ACK packet received, by sending correcting ACK packet 43. Correcting ACK packet 43 is identical to ACK packet 41, containing the current client sequence number C_ISN+1 and the ACK number S_ISN+2, which is the sequence number the client expects to see from the server. The server simply ignores this correcting ACK packet. The client could send other correcting ACK packets (not shown) in response to late SYN+ACK packets 48, 49.

Figure 8:
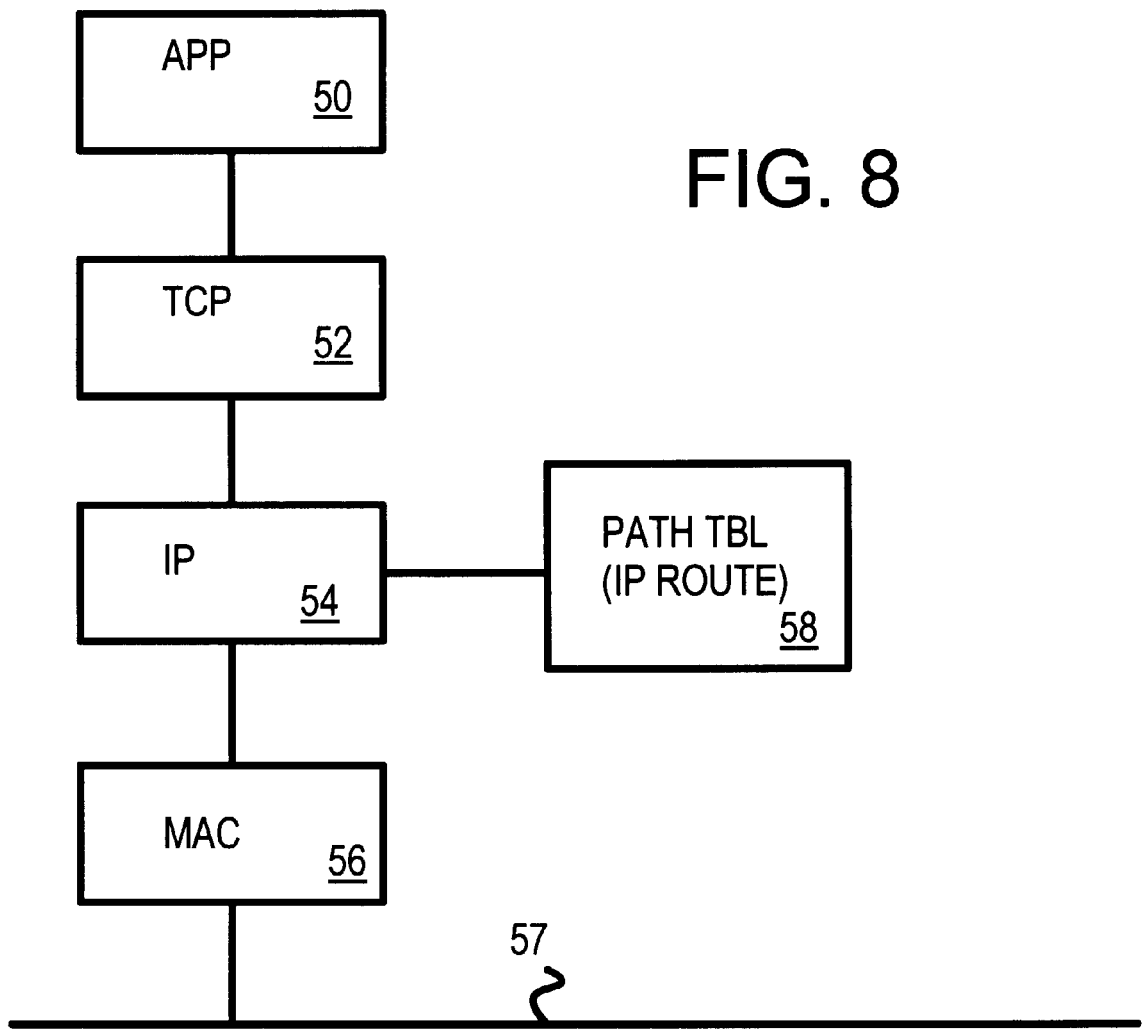
FIG. 8 is a diagram of a server's TCP/IP stack that includes a path-matching routing table storing the fastest routes for open connections.

Server Includes IP Routing Table for Desired Paths—FIG. 8

FIG. 8 is a diagram of a server's TCP/IP stack that includes a routing table storing the fastest routes for open connections. Packets are received from the Internet, usually through a gateway to local network 57. These packets are error checked by media-access-controller (MAC) 56, such as an Ethernet controller and its software drivers.

The data from MAC 56 are arranged into IP packets and sent to IP layer 54. IP layer 54 reads the destination IP address of the packet to confirm that the packet is destined for this server. The IP packets are sent up to TCP layer 52, where the data is extracted from IP packets. The connection is managed by TCP layer 52, which checks the SYN and ACK flags in packets used during the 3-way handshake. The data stream is then sent up to application 50. Application 50 includes server software that responds to hyper-text-transfer protocol (HTTP) requests from the client.

TCP layer 52 is modified from a standard TCP layer in a TCP/IP stack. When TCP layer 52 is instructed to send out a SYN+ACK packet to a client, the SYN+ACK packet is replicated into multiple packets with the same final destination IP address, that of the client. Source routing is used for each of these packets, and each packet header specifies a different path by including a different list of IP addresses of intermediate routers.

Path-matching routing table 58 is consulted by IP layer 54 when these routes are determined. Table 58 contains a list of alternate gateways and perhaps alternate intermediate routers, such as high-speed routers on the Internet backbone. Of course, table 58 cannot contain all IP addresses for all routers on the Internet, but some of the more important routers at critical junctions on the Internet can be included. Also, full routes to major ISP's can be included in table 58. For example, full IP lists of several alternate routes to America Online (AOL), Microsoft Network (MSN), Mindspring, PacBell, and other major ISP's can be included in table 58. Routes to major corporate sites can also be included.

Figure 9:
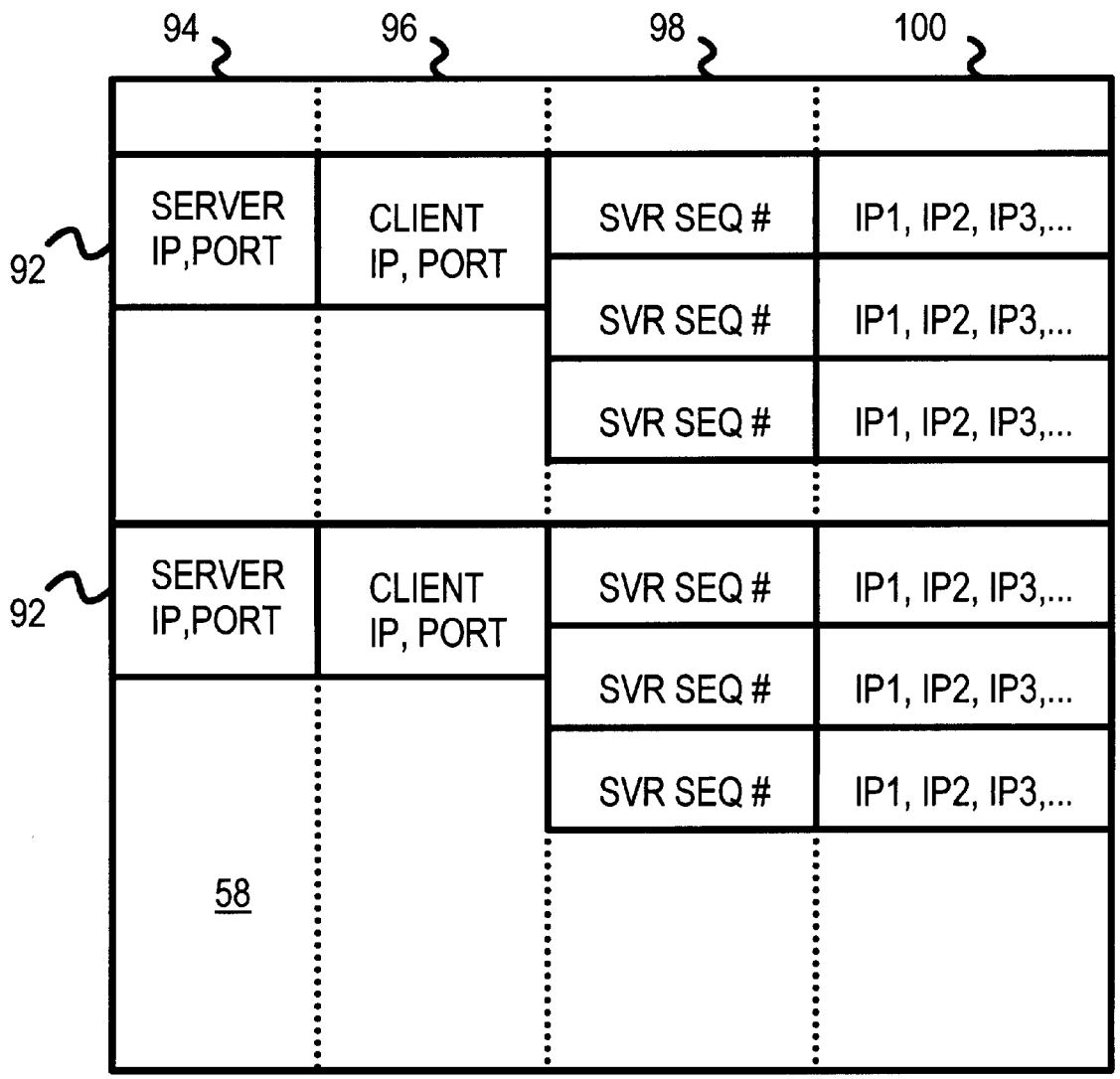
FIG. 9 shows a portion of the path-matching table.

FIG. 9 shows a portion of the path-matching table 58. Each entry 92 in path-matching table 58 can include:

Server's IP address and port field 94,

Client IP address and port field 96, server sequence number fields 98, and path IP addresses field 100.

When the client responds with the ACK packet, the incremented server sequence number (the ACK number of the packet) minus one can be used to find which packet reached the server first, by comparing server sequence fields 98. Then that packet's path field 100 is used to specify the path for future packets. The fields 98, 100 for slower paths can be discarded once the fastest path is determined.

A table entry itself can include: <client IP>, <client port>, <server IP>, <server port>, <path>, <server_ISS>. One table entry is generated for each generated SYN+ACK packet. During the connection establishment phase, the server writes the four port/address pairs into the table entries, and the path and sequence number of the particular SYN+ACK field into the <path> and <server_ISS> fields respectively. When the ACK packet from the client arrives, first the four port/address fields are used to find the entries in the list. A further compare is made to find the one entry with the matching ISS. This is the entry whose path is used. The other entries for this connection can then be deleted. Of course, other table structures are possible, such as with the port/address fields and a pointer to a linked list. Each entry in the linked list consists of a path/ISS pair. So when the ACK packet from the client arrives one entry in the list is found and then the entries of the linked list are searched to find the ISS match to get the path. Many different ways can be used to implement the table.

Figure 10:
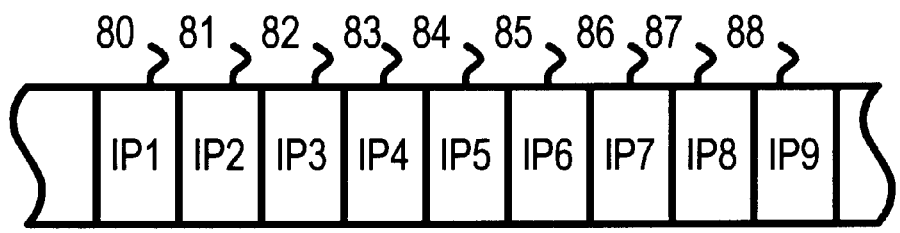
FIG. 10 shows source-routing fields in a packet header that specify IP addresses in the desired route through the Internet.

SourceRouting Fields in Packet Header—FIG. 10

FIG. 10 shows source-routing fields in a packet header that specify IP addresses in the desired route through the Internet. The IP header of each packet can include source-routing fields 80–87. IP options can be used to specify source routing. Extra bytes at the end of the IP header are used for IP options. When the header is longer than usual, an IP option is present. Each option has a code field (identifying the option) and a length field. Multiple IP options can exist in any given header. Source routing is just one of many different kinds of IP options.

Each of fields 80–88 contains an IP address of an intermediate router or gateway on the desired route and the desired client address as the last entry. When an intermediate router to which the packet is currently addressed receives the packet, it examines fields 80–88 for the next IP address in the route. The intermediate router can determine the next IP address with a pointer, which is contained in the IP header and points to the next router's address in fields 80–88. The router then writes the next address into the destination address field of the IP header, increases the pointer, and sends the packet to the next router.

Up to 9 IP addresses can be included in the header, allowing up to 9 intermediate routers in the path to be specified. When little is known about the location of the client with respect to known Internet routers, the source routing may only specify which gateway the server should use, or which access point to the Internet backbone to use. Several known intermediate routers can be used to test different paths, even when the whole path to the client is not known. For example, the location of the client may be unknown to the server. The server does know IP addresses of Internet routers in New York, Virginia, California, and Chicago. The server could send out 4 SYN+ACK packets to the client by specifying the IP address of one of these known routers. One packet could specify the IP address of the New York router, a second packet includes the IP address of the Virginia router, a third packet specifies the IP address of the California router, and the fourth SYN+ACK packet includes the Chicago router's IP address in its source-routing fields. When a path to the known router is also known, then IP addresses between the server and the known router can also be included.

If the client happens to be connected to a local ISP in Indiana, then the packet sent to the Chicago router likely is the first received by the client. Thus the path through the Chicago router is chosen.

ADVANTAGES OF THE INVENTION

The web server performs network measurement that measures actual network delays to a client. Internet delays are measured only when a new connection with a client is established. The measurement is performed as part of the connection-establishment handshake, not as a separate process. Thus the delay measurement is integral with connection establishment.

Continuous monitoring is avoided. Rather than use dedicated network monitoring equipment or software, the standard network software is used. No modification of intermediate network nodes is required, so the invention works with all ordinary Internet nodes. Only the server software is modified: no modification of the client is necessary. The network speed measurement can measure delays to any arbitrary client with standard TCP/IP software.

Delays for multiple paths to a single client are used to select the fastest or other optimal path for a new connection between a server and the client is chosen. Client-specific measurement for routing selection is obtained. Per connection granularity is obtained. No delay is caused by the measurement. Downstream traffic will traverse a fast path. This is desirable since downstream traffic contains more data/packets than upstream traffic for most web-sites.

ALTERNATE EMBODIMENTS

Several other embodiments are contemplated by the inventor. For example, different table arrangements are possible, and the table can be partitioned using a relational database structure. The path IP addresses can be replaced by a pointer or index into another table that stores the complete or partial path. A temporary storage area can be used to store information on the different paths attempted. Many possible variations are contemplated for the table of network paths. The source routing can be partially specified in the packet header. When only partially specified, the packet is routed to the IP addresses of Internet routers and gateways specified in the source routing fields when possible. When a router cannot send the packet to the next IP address, the routers can send the packet to other routers not specified. The packet may also pass through additional intermediate routers not specified in the source-routing list when loose source routing rather than strict source routing is specified.

Rather than find the fastest path to a client, the server can find the optimal path. For example, the server could connect to the Internet through two different gateways. One gateway could be less desirable than the other, perhaps being used for other more critical applications, or perhaps having a higher cost of operation. Rather than send out all SYN+ACK packets at the same time, the server could delay some of the packets, such as the packets being sent on paths through the more expensive gateway. This gives the packets through the less expensive gateway a head start in the race to the client. When delays are about the same for paths through both gateways, packets through the less expensive gateway arrive first at the client by virtue of their head start. Thus paths through the less expensive gateway are chosen. However, when paths through the expensive gateway are significantly faster, then paths through the expensive gateway are chosen. The amount of the head start can be adjusted for a cost-benefit tradeoff; a head start of one second for packets through less-expensive gateways or networks can reduce operating cost while still selecting fast paths. The optimal path is still chosen by the first SYN+ACK packet to arrive at the client, even when the packets are purposefully sent at different times.

The multiple SYN+ACK packets are transmitted at about the same time. In order to give each SYN+ACK packet a fair chance to win the race, the server will attempt to send the individual packets out with either no delay or just a very small delay between them. In all cases, the delay should be small enough not to affect the outcome of the race. The delay may be dependent on the network infrastructure and may be adjustable to different environments.

The path selection can also be modified for load balancing or other reasons. Paths through heavily-loaded routers can be handicapped by delaying transmission of SYN+ACK packets through the over-loaded routers. Load-balancing can be used before the SYN+ACK packets are sent to eliminate packets for paths through heavily-loaded routers.

Various vendors of TCP/IP stacks may vary in their response to the multiple SYN+ACK packets. Other protocols may be used besides TCP and IP. Any combination of TCP or IP with another network or transport layer protocol (respectively) is conceivable, as long as the transport layer protocol has some sort of connection establishment handshake and some means of starting a packet race and identifying who the winner is.

IP source routing is not required. It is possible to force a packet into a specific gateway by setting the media-access controller (MAC) address of the gateway. This requires that servers and gateways are on the same network segment.

A client's ISP is typically connected to one or more Internet backbone providers. Large web-sites are very often connected directly to several of these large backbones. The site administrator knows which of his routers connect into which backbone. If the SYN+ACKs are sent into each of these backbones, the currently fastest connection to the client is found, without having to know where it actually is. The site administrator can just configure the software with the addresses of his routers/gateways into these major backbones. Only one hop (to those routers) needs to be specified. Much knowledge about the network infrastructure further away from the web-site is not required. Only very local knowledge is required. Furthermore, the administrator can switch on source routing (it is often disabled) on these local routers, since they are under his control.

The mechanism can be implemented on any network device, such as a router, which sees all incoming and outgoing traffic to the server. The device can react to the SYN+ACK packet sent out by the server in response to the SYN packet. The device can replicate the SYN+ACK packet, insert a different sequence number into each duplicate and send them out according to the invention. The device needs to perform proper correction of sequence and acknowledgement numbers for later packets of the connection.

The mechanism can be implemented in a load-balancer with delayed binding. In this case the load-balancer will create multiple SYN+ACK packets and send them out according to the invention when it receives the SYN packet from the client. When the client responds with the ACK packet, the fastest path can be chosen. The connection can than be established with a server chosen by the load-balancer according to its load-balancing mechanism. The load-balancer needs to perform continuous updates to the SEQ and ACK numbers, in order to match the actual SEQ number chosen by the server. An example of a load-balancer with delayed binding is described in U.S. Pat. No. 5,774,660 by Brendel et al., and assigned to Resonate Inc. The load-balancer directs all outgoing packets along the same optimal path found during connection establishment.

Instead of modifying the IP or TCP module, a module can be inserted between link layer (e.g. Ethernet) and the network layer (e.g. IP). This module would also have to perform continuous updates to all packets, but it would allow inserting the module on any machine which allows modules to be inserted into the network stack. Such module could be an independent software module, or it could be embedded on a NIC.

If the server has multiple network interface connection (NIC) cards, each connected to a different network, then the packet can be forced onto different networks just by sending them out on different NICs.

Some caching could be used to avoid continues measurements for all new client requests from the same client or from the same client domain.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A method for establishing a new connection with a client over an optimal network path by a server that considers path delays comprising:

receiving an initial packet from the client, the initial packet requesting the new connection with the server;

generating multiple initial reply packets, each initial reply packet of the multiple initial reply packets traversing at least a portion of different network paths from the server to the client;

generating a plurality of packet identifiers, and writing a different packet identifier to each of the multiple initial reply packets;

transmitting from the server the multiple initial reply packets with different packet identifiers, the multiple initial reply packets reaching the client over different network paths;

receiving an acknowledgement packet from the client, the acknowledgement packet including a packet identifier that uniquely identifies a first packet, the first packet being one of the multiple initial reply packets;

selecting as the optimal network path the network path used by the first packet; and specifying for the other packets sent to the client at least a portion of the optimal network path from the server to the client, whereby the optimal network path is selected from among the different network paths of the multiple initial reply packets sent to the client by the acknowledgement packet from the client.

2. The method of claim 1 wherein the client ignores other packets of the multiple initial reply packets that arrive at the client after the first packet arrives at the client.

3. The method of claim 1 wherein the client generates additional packets to the server for each of the multiple initial reply packets that arrive at the client after the first packet arrives at the client;

wherein the server ignores the additional packets from the client during connection establishment.

4. The method of claim 1 wherein the packet identifier in the acknowledgement packet that uniquely identifies one of the multiple initial reply packets is an increment of the packet identifier for a first of the multiple initial reply packets to arrive at the client, whereby the client generates the acknowledgement packet for the first packet of the multiple initial reply packets to arrive.

5. The method of claim 4 further comprising:

generating an initial sequence number in the client;

including the initial sequence number from the client in a sequence field of the initial packet;

the server incrementing the initial sequence number from the initial packet to generate an incremented client sequence number; and the server writing the increment client sequence number to an acknowledgement sequence field of each of the multiple initial reply packets, whereby a same acknowledgement sequence number is used in all of the multiple initial reply packets to the client.

6. The method of claim 5 further comprising:

generating an initial server sequence number for the server;

the server generating the different packet identifiers from the initial server sequence number;

the server writing the different packet identifiers to the sequence field of the multiple initial reply packets, wherein a different sequence number is written to each initial reply packet, whereby different sequence numbers identify the multiple initial reply packets.

7. The method of claim 6 wherein the plurality of packet identifiers are server sequence numbers that are incremented for each data or SYN packet sent or received by the server.

8. The method of claim 1 wherein the initial packet is a TCP packet with a SYN flag that is set, but an ACK flag that is not set;

wherein each initial reply packet of the multiple is a TCP packet with a SYN flag that is set, and an ACK flag that is also set; and wherein the acknowledgement packet is a TCP packet with a SYN flag that is not set, and an ACK flag that is also set, whereby path measurement and selection is integral with a 3-way handshake to establish the new connection between the server and client.

9. The method of claim 8 wherein the different network paths from the server to the client are specified by source routing, by specifying a media-access-controller MAC address of a gateway, or by a tag for an intermediate network point.

10. The method of claim 8 wherein each of the multiple initial reply packets are transmitted from the server at substantially a same time, wherein the optimal network path is a fastest path to the client.

11. The method of claim 8 wherein a subset of the multiple initial reply packets sent over less desirable network paths are sent after other initial reply packets sent through more desirable network paths, whereby less desirable network paths are handicapped by delaying packet transmission.

12. A path-optimizing web server, the server comprising:

a network connection for receiving packets sent from a client over an Internet;

a sequence-number generator for generating an initial sequence number for a new connection;

a connection establisher that receives an initial packet from a client requesting a new connection with the server, the connection establisher generating several reply packets, each reply packet including:

a server sequence number generated from the initial sequence number, the server sequence number being different for each of the several reply packets;

wherein several of the reply packets are sent over different paths to the client in response to a single initial packet from the client;

a path selector, receiving a second packet from the client, the second packet being generated by the client in response to a first packet received by the client, the first packet being one of the reply packets that was received by the client before others of the reply packets, the path selector reading an acknowledgement sequence number generated by the client from the first packet;

wherein the path selector determines which of the several reply packets reached the client first by comparing the acknowledgement sequence number to the server sequence numbers of the several reply packets; and a packet transmitter, generating other packets in the new connection to be sent to the client after the acknowledgement packet is received, the packet transmitter sending other packets on the path from the server to the client used by the first packet received by the client, whereby the path-optimizing web server selects the path to the client by determining which of the several reply packets reached the client first.

13. The path-optimizing web server of claim 12 wherein the several reply packets are sent from the server at substantially a same time, but arrive at the client at different times due to varying path delays through the Internet, whereby the first packet is sent over a fastest path of the different path to the client.

14. The path-optimizing web server of claim 13 wherein each reply packet further comprises:

a source-routing field with a list of addresses of intermediate routers on a path from the server to the client;

wherein each of the reply packets contains a different list of addresses of intermediate routers in the source-routing field;

wherein the path selector decrements the acknowledgement sequence number from the second packet to generate a decremented number, the path selector selecting the first packet as one of the several reply packets having a server sequence number that matched the decremented number, whereby the server selects the optimal path using the server sequence number.

15. A computer-program product comprising:

a computer-usable medium having computer-readable program code means embodied therein for establishing a new connection at a server with a remote client over an optimal network path, the computer-readable program code means in the computer-program product comprising:

network connection means for transmitting and receiving packets from the remote client;

a server application, connected to the network connection means, for serving web pages to the remote client in response to requests from the remote client;

initial means for receiving an initial packet from the remote client, the initial packet requesting the new connection with the server;

multi-packet means for generating multiple initial reply packets, each of the multiple initial reply packets specifying at least a portion of different network paths from the server to the remote client;

multi-identifier means for generating a plurality of packet identifiers, and for writing a different packet identifier to each of the multiple initial reply packets;

multi-transmit means for transmitting from the server the multiple initial reply packets with different packet identifiers, the multiple initial reply packets reaching the remote client over different network paths;

acknowledgement means for receiving an acknowledgement packet from the remote client, the acknowledgement packet including a packet identifier that uniquely identifies a first packet, the first packet being one of the multiple initial reply packets;

select means for selecting as the optimal network path the network path used by the first packet; and path means for specifying in the other packets sent to the remote client at least a portion of the optimal network path from the server to the remote client, whereby the optimal network path is selected from among the different network paths of the multiple initial reply packets sent to the remote client by the acknowledgement packet from the remote client.

16. The computer-program product of claim 15 wherein the initial packet is a TCP packet with a SYN flag that is set, but an ACK flag that is not set;

wherein each of the initial reply packets is a TCP packet with a SYN flag that is set, and an ACK flag that is also set; and wherein the acknowledgement packet is a TCP packet with a SYN flag that is not set, and an ACK flag that is also set, whereby path measurement and selection is integral with a 3-way handshake to establish the new connection between the server and client.

17. The computer-program product of claim 16 wherein the plurality of packet identifiers are server sequence numbers that are incremented for each packet sent or received by the server.

18. The computer-program product of claim 16 wherein each of the multiple initial reply packets are transmitted from the server at substantially a same time, wherein the optimal network path is a fastest path to the remote client.

19. The computer-program product of claim 15 wherein the computer-readable program code means further comprises:

handicap means for delaying a subset of the multiple initial reply packets sent over less desirable network paths, the subset being sent after other initial reply packets sent through more desirable network paths, whereby less desirable network paths are handicapped by delaying packet transmission.

20. The computer-program product of claim 17 wherein the path means writes a list of intermediate IP addresses to headers of the other packets to specify at least a portion of the optimal network path from the server to the remote client, the intermediate IP addresses being Internet Protocol (IP) addresses of intermediate routers on the optimal path.

* * * * *